United States Patent [19]
Ohadi et al.

[11] Patent Number: 5,769,155
[45] Date of Patent: Jun. 23, 1998

[54] ELECTROHYDRODYNAMIC ENHANCEMENT OF HEAT TRANSFER

[75] Inventors: Michael M. Ohadi, Columbia; Serguei V. Dessiatoun, Colmar Manor, both of Md.

[73] Assignee: University of Maryland, College Park, Md.

[21] Appl. No.: 673,424

[22] Filed: Jun. 28, 1996

[51] Int. Cl.$^6$ ................................................. F28F 13/12
[52] U.S. Cl. ...................... 165/109.1; 165/96; 204/600
[58] Field of Search .................... 165/109.1, 96; 204/600

[56] References Cited

U.S. PATENT DOCUMENTS

| | | | |
|---|---|---|---|
| 3,477,412 | 11/1969 | Kitrilakis | 165/109.1 X |
| 4,651,806 | 3/1987 | Allen et al. | 165/96 X |
| 5,072,780 | 12/1991 | Yabe | 165/96 X |
| 5,632,876 | 5/1997 | Zanzucchi et al. | 204/600 |

FOREIGN PATENT DOCUMENTS

| | | |
|---|---|---|
| 58-37495 | 3/1983 | Japan . |
| 58-37496 | 3/1983 | Japan . |
| 61-225589 | 10/1986 | Japan . |
| 61-225590 | 10/1986 | Japan . |
| 61-225591 | 10/1986 | Japan . |
| 61-225592 | 10/1986 | Japan . |
| 35695 | 1/1991 | Japan . |
| 170575 | 9/1951 | Sweden . |
| 617672 | 7/1978 | U.S.S.R. . |
| 1578438 | 7/1990 | U.S.S.R. | 165/109.1 |

OTHER PUBLICATIONS

M.M. Ohadi, Elecrohydrodynamic Enhancement of Heat Transfer in Heat Exchangers, Dec. 1991, ASHRAE Journal, 13 pages.

C.A. Geppert, Electrohydrodynamically Enhanced Heat Transfer in Pool Boiling, Jul. 1994, a thesis.

Primary Examiner—John Rivell
Assistant Examiner—Christopher Atkinson
Attorney, Agent, or Firm—Watson Cole Stevens Davis,P.L.L.C.

[57] ABSTRACT

An apparatus for electrohydrodynamic augmentation of heat transfer with a working fluid comprising a heat transfer surface, said surface being formed with fins extending from a side of said surface in contact with the working fluid, said fins defining at least one channel having confronting sidewalls; an elongated, electrically conductive electrode disposed in the channel in relatively closely spaced relation between the sidewalls for carrying a current and producing an electric field for interacting with the working fluid to enhance heat exchange with the surface. At least one insulator disposed for engaging the channel in longitudinal spaced apart locations therealong. The insulator for supporting the electrode in the spaced standoff relation with the sidewalls for preventing excessive current flow between the electrode and the heat exchange surface through the working fluid and the longitudinal spacing of the insulator facilitating convective and conductive heat transfer of the working fluid with the surface.

20 Claims, 4 Drawing Sheets

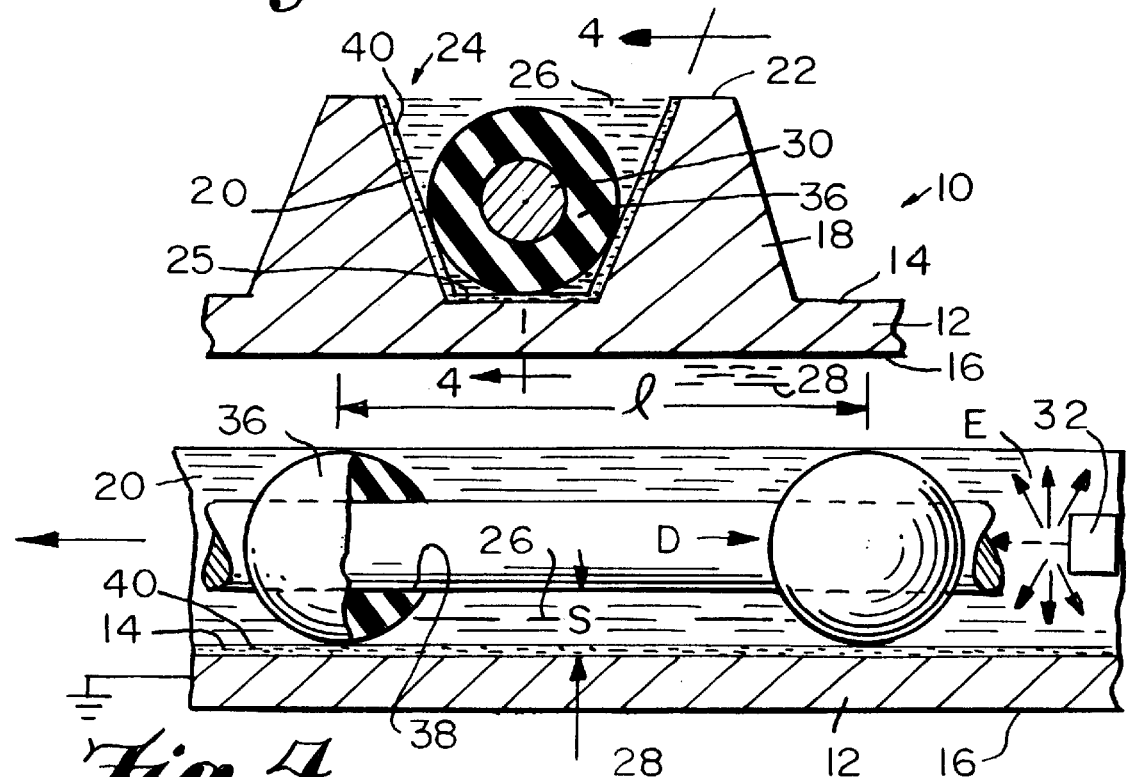
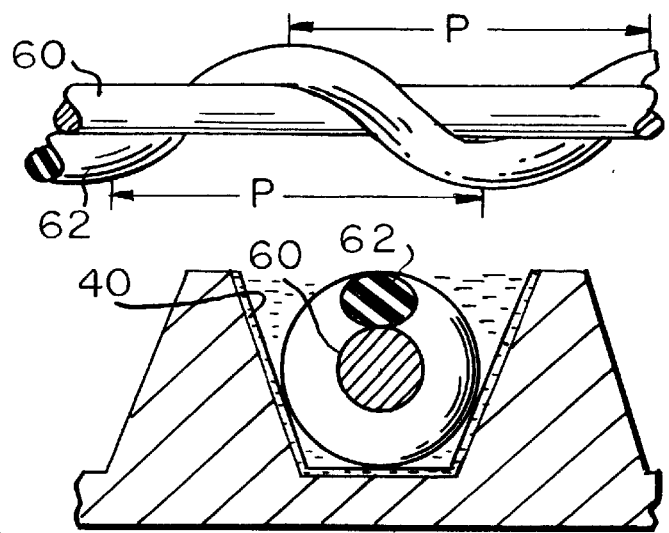
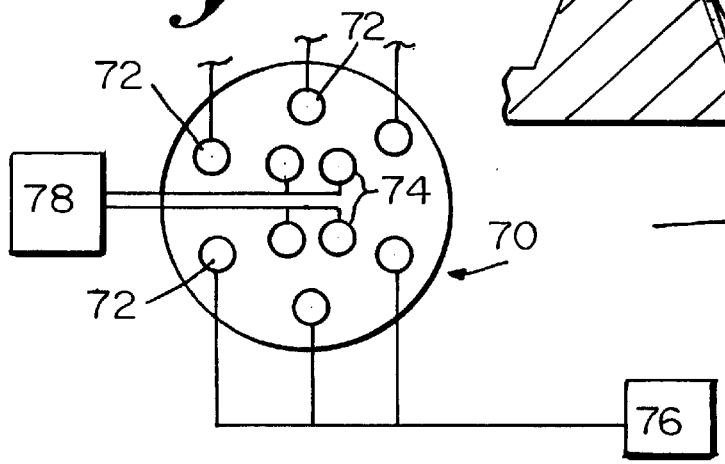

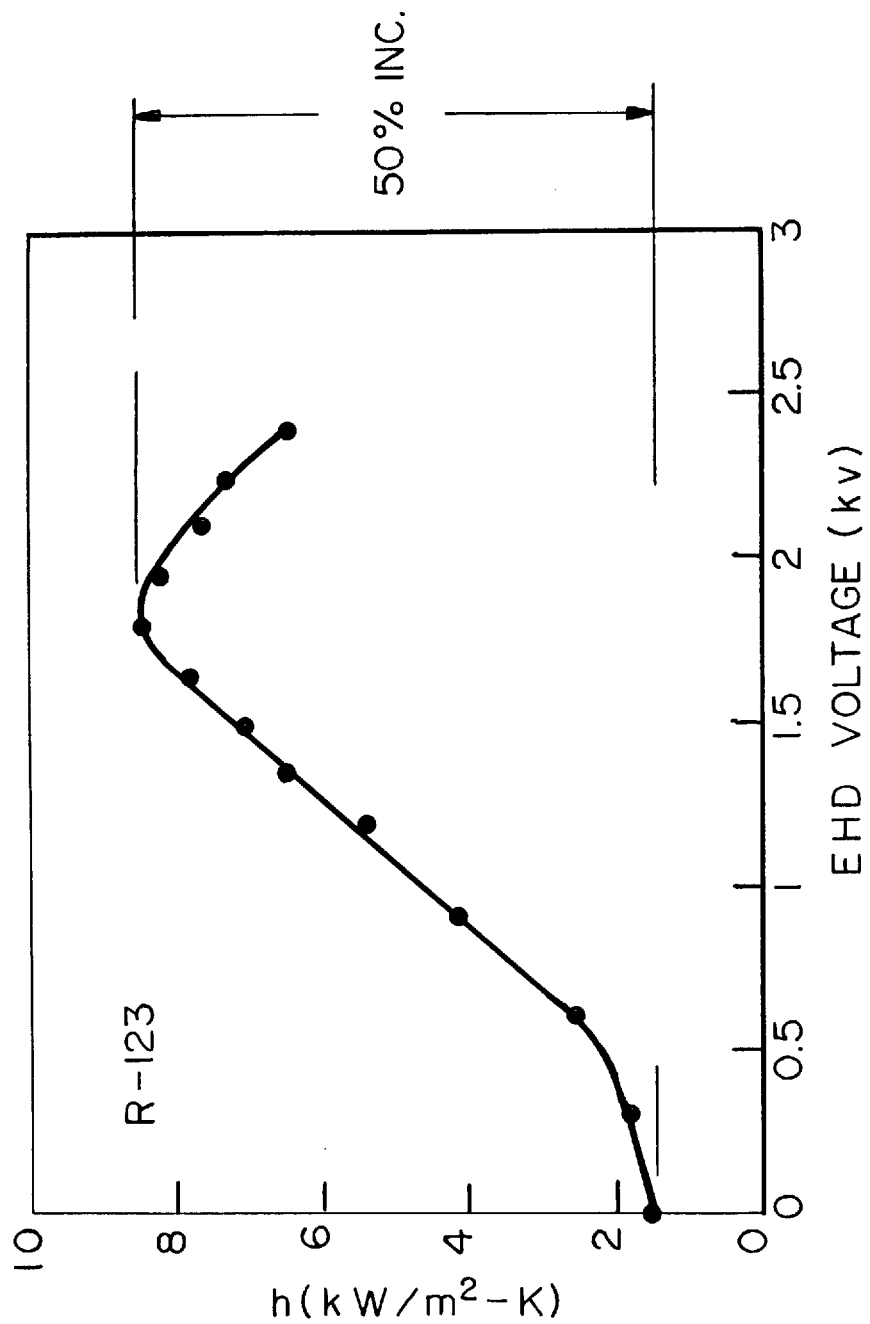

ELECTROHYDRODYNAMIC ENHANCEMENT OF HEAT TRANSFER

BACKGROUND OF THE INVENTION

This invention pertains to electrohydrodynamic enhancement of heat transfer in heat exchangers and in particular to closely coupled EHD heat transfer enhancement employing a finned heat exchanger.

The promotion of energy conservation and global environmental protection is establishing new standards for more efficient production and utilization of energy in various industrial sectors. In the HVAC/refrigeration industry substitution of CFCs with Ozone-safe refrigerants presents new challenges. Many of the newly identified substitutes are considerably more expensive and exhibit poor heat transfer characteristics. Therefore, any approach that can lead to system size reduction and refrigerant charge saving is of critical importance.

In the power generation industry, high-performance heat exchangers are needed to bring about substantial improvements in effective utilization of waste heat in low-temperature heat recovery applications. Another area where high-performance heat exchangers are needed is in low-temperature power and refrigeration cycles that operate on renewable-base energy sources such as Ocean Thermal Energy Conversion (OTEC), geothermal and solar energy systems. Presently, excessively large heat transfer surface area requirements prohibit cost-effective use of these systems.

Electrohydrodynamic (EHD) enhancement is a technique which has been shown to result in enhanced heat transfer in heat exchangers involving single-phase or phase-change processes. EHD couples a high-voltage, low-current electric field with the flow field of a low electrical conductivity fluid medium. Many industrially significant heat exchanger fluids including CFCs and newly identified substitute refrigerants have proven to be suitable for use with this technique. EHD utilizes the effect of electrically-induced secondary motions to destabilize the thermal boundary layer near the heat transfer wall, thereby leading to increased turbulence or mixing of the bulk flow and substantial heat transfer enhancement. The magnitude and nature of enhancements are a direct function of electric field parameters (such as field potential, polarity, pulse vs. steady discharge, electrode geometry and spacing); flow field parameters (such as flow Reynolds number and the working fluid properties); and heat transfer surface conditions (e.g., smooth or integrally finned/grooved configurations).

Enhancement of the heat transfer characteristics of a surface by means of EHD has been practiced in a number of different ways. The common method is to use wire or plate electrodes parallel and adjacent to the heat transfer surface. The electrode geometry and configuration is often system dependent and may vary in design and orientation from system to system. For duct flows, it is possible to use the primary duct wall as the active electrode and the opposite wall as the grounded electrode or vice versa.

The specific enhancement mechanism is strongly dependent on the type of fluid and the heat transfer process involved. For example, in gases, corona discharge, known as the ionic wind or corona wind, is the primary driving force behind the heat transfer enhancements. The corona wind effect may be thought of as a free jet that is discharged into a fluid of the same type. Interaction of the corona wind with the main stream flow enhances bulk mixing of the flow field leading to higher heat transfer rates. For phase-change applications, the EHD mechanism is driven by the compound combination of various effects such as convection and turbulence generated by charge injection of the fluid, surface instability effects, and a EHD liquid extraction phenomenon.

The driving force behind electrically-induced secondary motions responsible for the EHD effect is the electric body force. For a dielectric permitivity $\in$, mass density $\rho$, and temperature T when subjected to an applied electric field strength E, this body force can $$\vec{f}_e = \rho_c \vec{E} - \frac{1}{2} E^2 \nabla \in + \frac{1}{2} \nabla \left[ E^2 \rho \left( \frac{\partial \in}{\partial \rho} \right)_T \right]$$

be expressed as:
where $\rho_c$ is an electric field space charge density, a measure of fluid response to the electric field. The first term on the right side of the equation is the electrophoretic force that results from the net free charges within the fluid. This term is usually of importance in single-phase flows where the EHD current discharge is predominantly responsible for generation of electrically-induced secondary motions and the resulting enhancement mechanism. For two-phase processes (e.g., boiling, condensation, or mass transfer applications) the EHD current discharge is small enough such that the electric power consumption relative to the capacity of the heat exchanger in most cases is negligible.

However, the second term, called the dielectrophoretic force, and the third term, called the electrostrictive force, contribute substantially to the EHD body force in a phase-change process. Note that the second and third terms are directly proportional to square power of the applied electric field, i.e., the applied voltage. For the second term $\nabla \in$ is a measure of difference between permitivity of the fluid and the gas phases. Therefore, the higher the density or permitivity difference between the liquid and the vapor phase for a given fluid, the greater the electric field force.

The electrostrictive force (third term) is a measure of the non-uniformity of the applied electric field near the heat transfer surface. Note that the $\nabla$ is outside the bracket. Therefore, one can expect a better performance with enhanced tubes (finned or micro-structured) when compared to the smooth tubes. Moreover, for applications where a thermal gradient exists within the flow field (either single phase or phase-change processes) the contribution to the electric body force by the second and third terms increases.

For applications involving boiling and condensation the fact that the electric permitivity of liquid is much higher than that of vapor, helps a great deal in the EHD enhancement mechanism. The liquid tends to be attracted to areas of high electric field strength whereas the vapor moves away from the high-electric filed zones. This leads to increased turbulence and boiling activity near the heat transfer surface.

When compared to active augmentation techniques, e.g., rotation, injection and vibration, EHD exhibits a number of important advantages. Active augmentation techniques are generally mechanically complex and somewhat cumbersome to manufacture. Furthermore, the energy required to activate these systems can be a significant fraction of the power employed in pumping the fluid. In these respects, EHD enhancement is superior. Although high voltages are employed, the electrical power consumed by the EHD process is extremely small due to the relatively small currents employed. The additional manufacturing costs are minimum, as the EHD process generally requires a small size transformer and simple wire or plate electrodes.

In most cases, the only intrusion to the flow field is a fine wire. Thus, the corresponding rise in pressure drop is often much smaller than those of other passive and active augmentation techniques. The installation and maintenance is no more difficult than any other active heat transfer technique and the cost of the high-voltage power supply can be minimal. For example, electric high voltage generators of the type used in television sets or room air purifiers may be employed as the high-voltage source. The EHD effect also appears to be chemically inert.

The safety aspect of EHD may be misjudged as a drawback if careful attention is not paid to the manner in which these systems operate. Although EHD systems work at relatively high voltages, the fact that very small currents are employed reduces the hazard of EHD fields to a point well below that of normal low-voltage, household supplies.

The risk of electrical shock in EHD is further reduced because all live parts are either completely immersed in a dielectric fluid and are out of normal reach, or can be easily insulated to provide such protection. Mechanical augmentation techniques generally have higher current requirements as well as more parts. Thus, safety risks are correspondingly higher. Accordingly, when compared to mechanical active augmentation techniques, EHD systems are relatively safer, the electric hazard is lower and the mechanical hazard is non-existent due to the absence of moving parts. Nevertheless, it is desirable to further reduce the shock hazard by reducing the applied voltage and thus the resulting power consumption.

It is desirable to be able to rapidly control the magnitude of enhancements in an EHD process by adjusting the applied electric field. This is of critical importance in emergency cooling of high heat flux components. It is also highly desirable to provide heat transfer enhancement in situations where heat transfer surface degradation over time is unavoidable. It is also important to provide active augmentation economically to complicated curved passages such as those in a typical industrial heat exchanger.

SUMMARY OF THE INVENTION

The invention is based upon the discovery of a closely coupled electrohydrodynamic (EHD) enhanced finned heat exchange surface. In a particular embodiment, the invention comprises a surface formed with a plurality of relatively closely spaced fins extending from at least one side of the surface. The fins define at least one channel having confronting sidewalls in heat exchange relation with a working fluid. An elongated electric conductive electrode is disposed in the channel in closely spaced relation between the sidewalls for carrying a current and establishing a non-uniform electric field within the channel. At least one electrical insulator cooperates with the electrode for supporting it in the channel at longitudinally spaced apart locations therealong. The insulator supports the electrode in a closely spaced standoff relation with the sidewalls for facilitating heat transfer at relatively low voltage and being sufficient for preventing excessive current flow between the electrode and the heat exchange surface through the working fluid.

In one embodiment, the insulator comprises an insulating fiber closely wound about the electrode. In another embodiment, the insulator comprises a plurality of beads.

BRIEF DESCRIPTION OF THE DRAWINGS

FIG. 3 is a fragmentary cross-section of the EHD enhanced heat exchanger of the invention taken along line 3—3 of FIG. 1;

FIG. 4 is a fragmentary cross-section of the EHD enhanced heat exchanger of the invention taken along line 4—4 of FIG. 3;

FIG. 6 is a fragmentary side elevation of an alternative embodiment of the invention employing a wire electrode and a dielectric spirally would filament support;

FIG. 7 is a fragmentary and sectional view of a heat exchanger employing the electrode of FIG. 6;

FIG. 8 is a schematic illustration of a shell and tube heat exchanger with variable EHD applied to tubes for balancing enhanced heat exchange among the tubes; and FIG. 9 is a plot of the heat transfer coefficient ($kW/m^2$–°K) V EHD voltage (kW) in R-123 showing a 50% increase in heat transfer coefficient at about 1.7 kW.

DESCRIPTION OF THE INVENTION

Figure 1:
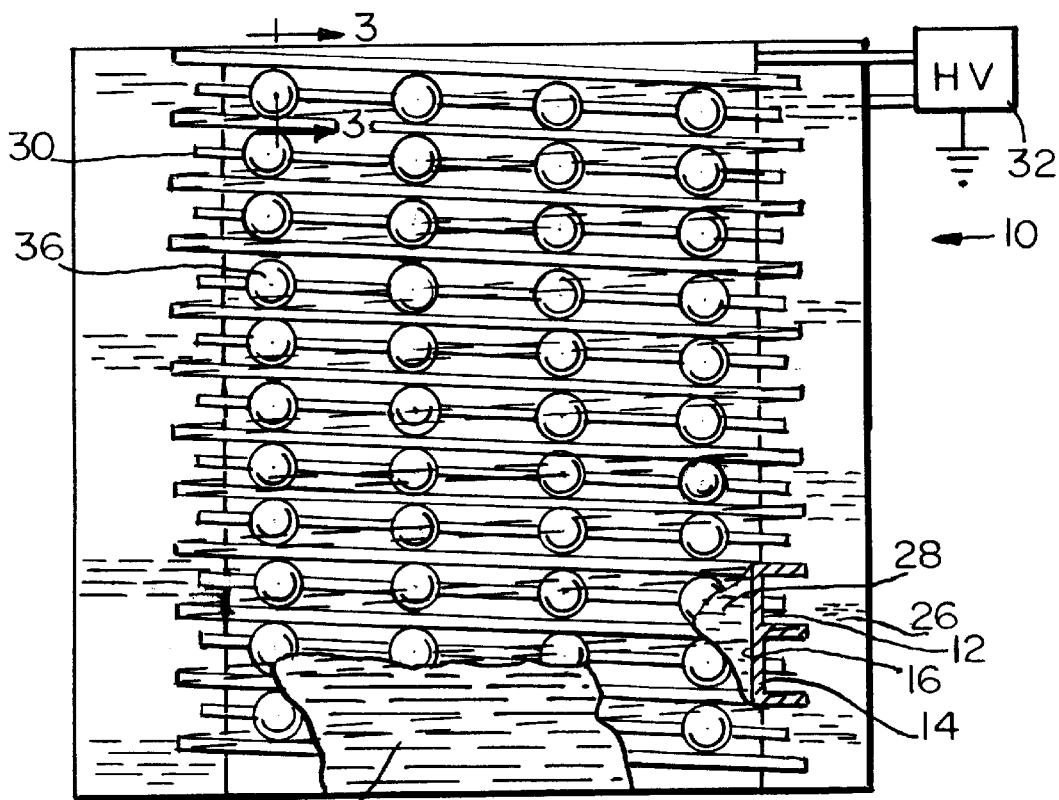
FIG. 1 is a side view of a closely coupled electrohydrodynamically (EHD) enhanced finned heat exchange surface in accordance with an embodiment of the present invention.
Figure 2:
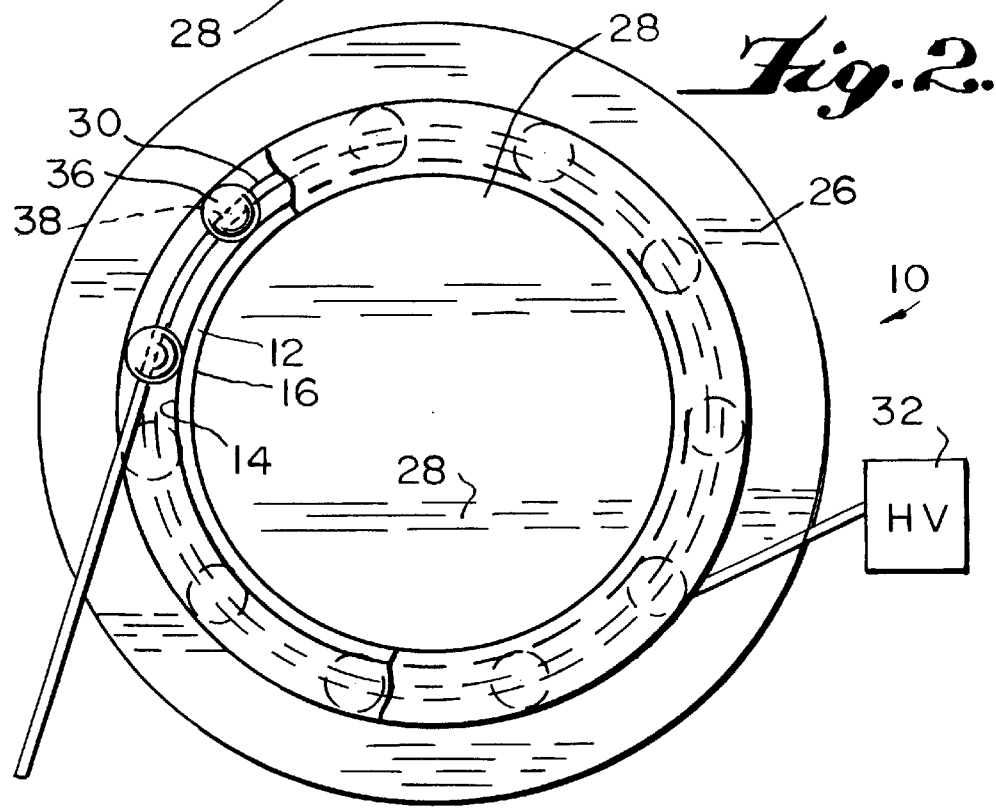
FIG. 2 is an end view of the heat exchanger of FIG. 1.

As illustrated in FIGS. 1—3, the invention comprises an electrohydrodynamic (EHD) enhanced heat exchanger 10 which may be in the form of a tube 12 forming a heat conductive barrier between respective first and second heat exchange sides 14 and 16. The first exchange side 14 may incorporate relatively narrow spiral fins 18 extending therefrom about 0.63 mm at a pitch of about 40 fins/in. The fins 18 have sidewall portions 20 and an upper wall 22. The fins 18 form a trough 24 having a bottom wall 25 between adjacent confronting sidewall portions 20, as shown. A working fluid or heat exchange fluid 26 is provided for heat exchange with the first heat exchange surface 14 of the heat exchanger 10. The working fluid 26 may be produced by a source S of fluid pressure difference driven at a flow velocity v. The flow velocity v is sufficient to form a thermal boundary layer in the vicinity of the heat transfer surface 12. The flow of the working fluid is generally laminar. Likewise, a heat exchange fluid 28 may be provided in the tube 12 for heat exchange with the surface 16. Depending upon the arrangement, the working fluids 26 or 28 may be the cooling or heating fluids and vice versa.

In accordance with the invention, an electrode 30 wire is located in the trough 24. The electrode 30 may be coupled to a controllable source of high voltage 32. The heat exchange surface 12 may be electrically conductive and act as a ground.

In the embodiment of FIGS. 1–4, insulators 36, in the form spherical beads, are formed with a central opening 38 sized for receiving the electrode 30 wire therethrough. The insulators 36 are spaced apart longitudinally along the electrode by a center to center spacing of l, sufficient to provide a standoff distance between the electrodes and the surface 14, as shown. The insulators 36 have a diameter D which is sized so as to closely nest against the confronting walls 20 of the trough 24. As a result, the electrode 30 is spaced from the conductive heat exchange surface 14 by a minimum spacing or standoff distance S, which in an exemplary embodiment may be in a range of about 0.1 mm and 1.0 mm.

Under normal operation conditions, the working fluid 26, in contact with the walls 20 of the fins 18, forms a disruptable layer 40 adjacent to the wall 14. The voltage source 32 produces an electric field E about the wire 30. The electric field E is highly non-uniform because of the angled shape of the trough 24. The non-uniform field thereby disrupts the layer 40 thereby enhancing the heat exchange between the heat exchange surface 12 and the working fluid 26. The layer 40 may also include a region of viscous and laminar flow.

Figure 5A:
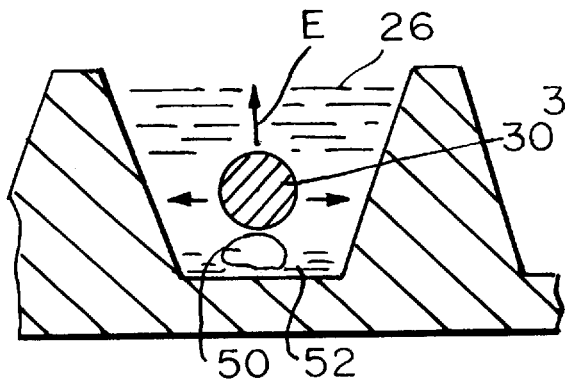
FIGS. 5A–5E illustrate examples of the EHD effect in various embodiments.
Figure 5B:
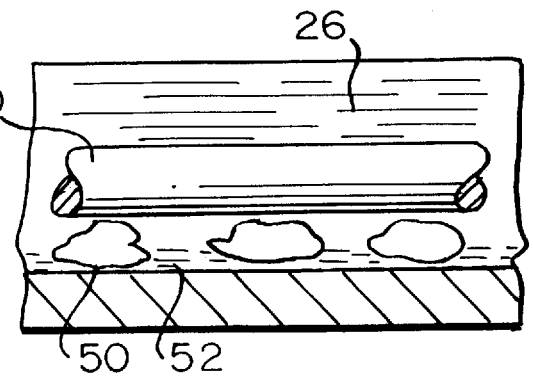

FIGS. 5A–5E illustrate the principle operation of the invention in greater detail. In FIGS. 5A and 5B, the tube 12 may be heated by an internal heater, not shown, or by a heated working fluid. The tube 12 is heated so that the heat exchange surface 14 is above the boiling point of the working fluid which may be a variety of materials, including distilled water or dielectric fluids such as R134A. Normally, without the EHD feature of the invention, bubbles 50 would form on the heat exchange surface 14 and slowly move away therefrom. As a result, the heat exchange between the surface 14 and the working fluid 26 would be governed by the dynamics of unenhanced convection and conduction only. The slow moving bubbles would result in a relatively thick surface layer of working fluid which inhibits heat exchange. The EHD technique of the invention rapidly draws the bubbles 50 away from the surface (FIGS. 5A–5B) producing a thin film 52 of working fluid which is easily evaporated thereby enhancing heat exchange.

Figure 5C:
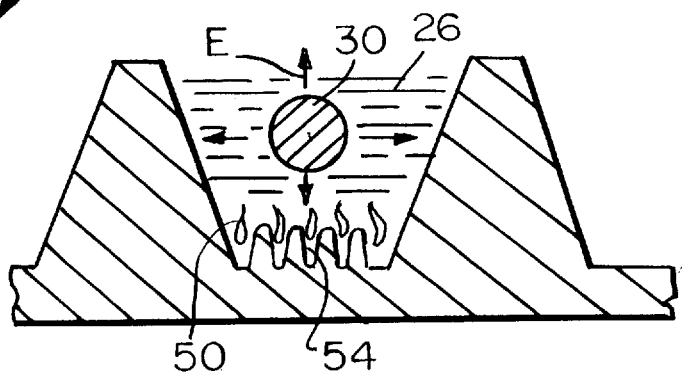

FIG. 5C shows an embodiment of the invention wherein the bottom wall 25 of the trough 24 has a textured surface 54 allowing for the production of a larger number of boiling sites and superheating of a vapor layer between the fins that results in improved boiling performance. The textured surface 54 also affects the field E and produces greater irregularity therein which in turn proves the disruptive quality of the field and thereby further enhances the heat exchange and thin-film evaporation.

Figure 5D:
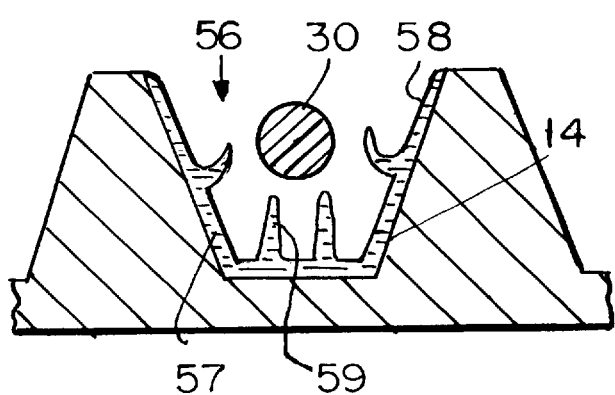
Figure 5E:
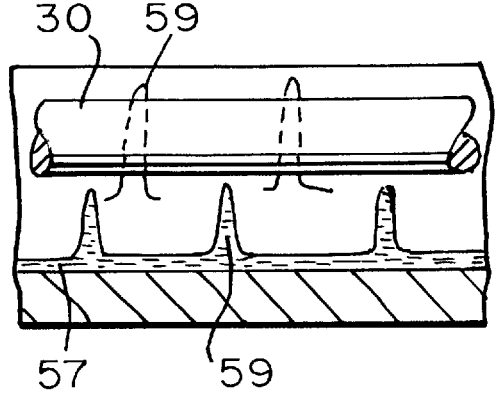

FIGS. 5D and 5E illustrate how EHD can improve condensation also. In this case, the surface 14 is cool relative to a vaporous working fluid 56. As a fluid contacts the surface 14, the vapor condenses forming a fluid layer 58 on the surface 14. Without EHD, the fluid layer would thicken thereby reducing heat exchange. However, the EHD technique of the invention draws the liquid away from the surface 14 resulting in a relatively thin layer 57 of fluid and liquid spouts 59 which thereby enhances heat exchange and further improves condensation.

FIGS. 6 and 7 illustrate another embodiment of the invention employing an electrode comprising a wire electrode 60 and a spirally wound insulator 62. The wire 60 may be a relatively thin stainless steel wire wrapped with an organic dielectric filament 62 of about the same size. The filament 62 is wrapped about the wire 60 at a pitch P which is about the same as the length L between the beads in the embodiment of FIG. 1. An important advantage of the arrangement of FIGS. 6 and 7 is that the wire 60 and filament 62 may be easily manufactured as a unit. In the arrangement of FIG. 1, the beads must be threaded onto the wire thereby resulting in a more complicated manufacturing operation.

It is important to mention that the insulators, i.e., the beads 36 or the filament 62 should occupy a minimum amount of space in the trough 24 so as not to interfere with heat exchange or the bubbling phenomenon. Also, it is desirable not to fully insulate the wires 30 and 60 because this would concentrate the field in the dielectric and thereby reduce the EHD effect. The material forming insulators 30 and filament 60 may be a suitable material compatible with the working fluid. An exemplary material is PTFE.

The heat transfer coefficient of a heat exchanger in accordance with the present invention may be greatly improved by reducing the standoff distance S to a minimum. It has been found that the smallest standoff distance S results in the highest heat transfer characteristic for each corresponding voltage. Thus, safe and efficient heat transfer can be accomplished in accordance with the invention with reduced voltage and correspondingly low power consumption. Prior art systems, for example, require up to 25,000 volts to effectively enhance boiling heat transfer by EHD. The present invention results in similar or better efficiencies with voltages about 1,500–2,500 volts or about one order of magnitude less. The result is an exponential decrease in the required applied voltage with a decreasing standoff distance between the electrode 30 and the heat transfer surface 12. The foregoing decrease in applied voltage can be achieved with various commercially significant working fluids, e.g., R123A.

In the embodiments illustrated herein, for example, a voltage of 1,500 volts produces a current less than about 1–20$\mu$ amps in the working fluid with the electrode 30 centered in the trough 24 about 0.5 mm from the side 20 and bottom 25 respectively. Polarity DC does not seem to significantly affect the efficiency. Likewise, an AC voltage, measured in RMS, produces good EHD enhancement.

According to the invention, current flow is not excessive. Expressed differently, current flow does not produce a current density sufficient to damage the molecular structure of the working fluid. Also, current flow does not result in other than negligible power consumption or power consumption greater than conventional systems for example, less than about one percent of the heat exchange power.

FIG. 9 illustrates enhanced pool boiling resulting from the invention. A 50% increase in heat transfer coefficient is achieved at 1.7 kW EHD voltage in R123. This is comparable to a conventional system at 15 kV or at least one order of magnitude better.

According to the invention, EHD refers to applying a closely coupled high-voltage, low-current electrostatic field across a fluid in a heat exchanger, leading to substantial increase in the heat transfer coefficients. Enhancement factors are often an order of magnitude higher than any of the conventional techniques. The technique allows for rapid change in the field and thus offers electronic control for the heat exchanger, and is compatible with the latest enhanced tube/plate heat transfer surfaces.

The invention is applicable to refrigeration and air conditioning, cryogenics, aerospace, automotive, electronic cooling, biomedical and manufacturing. The system may be implemented in shell and tube heat exchangers, by applying wire electrodes over the heat transfer surface; and in plate-fin or tube-fin heat exchangers, by utilizing the plates themselves as electrodes. Dielectric fluids such as refrigerants/refrigerant mixtures, air, cryogenic fluids, oils and their derivatives, aviation fuel and other fluids with low electrical conductivity are particularly suitable for EHD. The voltage required depends on the geometry of the heat exchanger and design of the electrode, from a few volts to 2,500 volts. However, the current is small and not excessive, and the resulting power consumption is negligible. Also, both AC and DC are applicable, although in certain cases the DC source is preferred. EHD is particularly adapted for use in the transport refrigeration and automotive industries. The DC source (usually 12 volts) used in such applications can easily be elevated to higher voltages through use of diodes and capacitors much similar to those used in color TVS (where typically more than 20 kV is used in the corona tube). The live components (electrodes) are fully enclosed and the discharge current is extremely small so that safety concerns are minimal and less than the hazard associated with the high-voltage current employed in TVS, certain computers and air cleaners. EHD is applicable to both single phase and phase-change processes. For example, the potential for substantial enhancement in the air-side, boiling and condensation, as well as control of frost formation, is possible.

Also, EHD may be used to balance heat exchange in arrangements where flow is likely to be unbalanced. For example, in a shell and tube heat exchanger 70, shown schematically in FIG. 8, the outer tubes 72 may allow a different fluid flow rate or temperature than the central tubes 74. Nonuniform distribution of heat transfer coefficients is particularly of concern in large tube bundle heat exchanges where the heat transfer coefficients in the top portion of the bundle could be as much as 50% higher than that of the bottom portion of the bundle. According to the invention, each of the groups of tubes; 72 and 74 may be controlled by variable sources 76 and 78 to achieve a selected heat transfer coefficient to compensate for the different flow rates. The tubes may also be individually controlled if desired. In either case, rapid adjustment, on the order of milliseconds, of the sources 72 and 74 may be controlled so as to produce a correspondingly rapid change in EHD enhancement.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed:

1. An apparatus for electrohydrodynamic (EHD) augmentation of heat transfer with a working fluid comprising:
   a heat transfer surface, said surface being formed with fins extending from a side of said surface for contact with the working fluid, said fins defining a channel having confronting sidewalls;
   an elongated, electrically conductive electrode disposed in the channel in relatively closely spaced relation between the sidewalls for carrying a current and producing an electric field when energized for interacting with the heat transfer surface and working fluid to enhance heat exchange with the surface; and
   at least one insulator disposed about the electrode for engaging the channel in longitudinal spaced locations therealong, said insulator for supporting the electrode in closely spaced standoff relation with the sidewalls sufficient for preventing excessive current flow between the electrode and the heat exchange surface through the working fluid, and the longitudinal spacing of the insulator facilitating convective and conductive heat transfer of the working fluid with the surface.

2. The apparatus according to claim 1 wherein the heat exchange surface comprises an electrically conductive material for interacting with the electric field non-uniformly to enhance the EHD augmentation.

3. The apparatus of claim 1 wherein the working fluid forms a thermal boundary layer with the heat exchange surface and the electric field disrupts the thermal boundary layer to produce a thin film layer for enhancing heat exchange.

4. The apparatus according to claim 1 further including means for applying a current to said electrode, wherein when the current results in an electric field producing turbulence in the working fluid adjacent to the heat exchange surface.

5. The apparatus according to claim 1 wherein the electrode comprises a conductive wire and the insulator comprises a dielectric filament spirally wound on the wire.

6. The apparatus of claim 5 wherein the filament has a relatively long pitch corresponding to the spaced locations on the heat exchange surface.

7. The apparatus of claim 5 wherein the insulator comprises a dielectric monofilament formed of a PTFE.

8. The apparatus according to claim 1 wherein the electrode comprises a conductive wire and the insulator comprise a plurality of dielectric spheres each having a central opening for receiving the wire therethrough.

9. The apparatus according to claim 1 wherein the electrode is spaced from the heat transfer surface by a distance in a range of about 0.1 to about 1.0 mm.

10. The apparatus according to claim 1 wherein the working fluid in flow communication with the electrode and has a relatively low electrical conductivity.

11. The apparatus according to claim 1 wherein the heat transfer surface is electrically conductive.

12. The apparatus according to claim 1 further including means for applying a voltage to the electrode in a range of about 1500 to about 2500 V in R123.

13. The apparatus according to claim 1 further including means for applying a voltage to the electrode of up to about 2500 V.

14. The apparatus according to claim 1 further including means for supplying the working fluid to the heat exchange surface with a flow velocity driven by an external source of fluid pressure difference, said heat exchange fluid having sufficient flow velocity for forming a thermal boundary layer in the vicinity of the heat transfer surface.

15. The apparatus of claim 14 wherein the flow velocity is laminar.

16. The apparatus of claim 14 wherein the heat exchange fluid forms a viscous boundary layer with the heat exchange surface.

17. The apparatus of claim 1 wherein the working fluid has a heat transfer coefficient when the electrode is not energized and said working fluid has a resulting heat transfer coefficient produced by the application of the electric field said resulting heat transfer coefficient being one order of magnitude less than the heat transfer coefficient when there is no electric field.

18. The apparatus of claim 1 wherein the current has a current density which does not exceed that which will damage the molecular structure of the working fluid.

19. The apparatus of claim 1 wherein the current results in a power consumption less than about one percent of the heat exchange power.

20. The apparatus of claim 1 including means for controlling the application of current for regulating heat transfer in accordance with the flow of working fluid.

* * * * *